July 14, 1959     J. N. GARRETT     2,894,653
COTTON BALE EXTRACTOR

Filed Dec. 31, 1957     2 Sheets-Sheet 1

INVENTOR
Jack N. Garrett

BY

ATTORNEY

July 14, 1959  J. N. GARRETT  2,894,653
COTTON BALE EXTRACTOR
Filed Dec. 31, 1957  2 Sheets-Sheet 2

INVENTOR
Jack N. Garrett

BY  *Cecil L. Wood*

ATTORNEY

United States Patent Office 2,894,653
Patented July 14, 1959

---

2,894,653
COTTON BALE EXTRACTOR
Jack N. Garrett, McGregor, Tex.
Application December 31, 1957, Serial No. 706,410
1 Claim. (Cl. 214—620)

This invention relates to a bale extractor, and it concerns more particularly a hydraulically operable unit, for attachment to the lift carriage of a conventional lift truck, for use in pulling selected bales of cotton or the like from stacks thereof.

In the cotton compress industry bales of cotton are commonly stacked one above another, in warehouses, in what is known in the industry as "cordwood" stack. These stacks may vary from 3 to 8 bales high, depending on the roof height. The principal object of this invention is to provide a hydraulically operable unit, for attachment to the lift carriage of a conventional lift truck, capable of being used to remove a selected bale from the stack without the necessity of removing the bale or bales above it.

Another object of the invention is to provide, in combination with a lift truck having a lift carriage, a hydraulically operable unit attached to the lift carriage and including means capable of acting upon a selected bale of cotton or the like comprising one of three or more bales arranged in a stack, to pull it from the stack, and separate means capable of acting upon the bale next above the selected bale, to lift the bale or bales above the selected bale, and restrain them against lateral displacement relative to the stack, while the selected bale is being pulled from the stack.

Another object of the invention is to provide, in combination with a lift truck having a lift carriage, a substantially rectangular frame attached to the lift carriage and lying in a horizontal plane, a pair of substantially rectangular sub-frames arranged transversely relative to the frame, the sub-frames being pivotally connected at one end to intermediate portions of the frame, in spaced relation to each other, and normally depending from the frame, a pair of hydraulic cylinders each pivotally connected at one end to one end of the frame and having a piston rod pivotally connected to the free end of the sub-frame nearest the opposite end of the frame, and a chain connected at one end to the frame and looped about a pair of rollers carried by the free ends of the sub-frames, the chain having a pair of hooks connected to its outer end for engagement with a selected bale of cotton or the like comprising one of several bales arranged in a stack, to pull it from the stack, as the sub-frames are swung outwardly by the action of the hydraulic cylinders, at least one of the sub-frames having toothed projections adjacent its free end for engagement with the bale next above the selected bale, to lift the bale or bales above the selected bale, and restrain them against lateral displacement relative to the stack, while the selected bale is being pulled from the stack.

Another object of the invention is to provide a bale extractor of the type described which is of simple, rugged construction, may be manufactured inexpensively, is efficient in operation and is comparatively indestructible.

The invention will be readily understood by referring to the following description and the accompanying drawing, in which.

Figure 1:
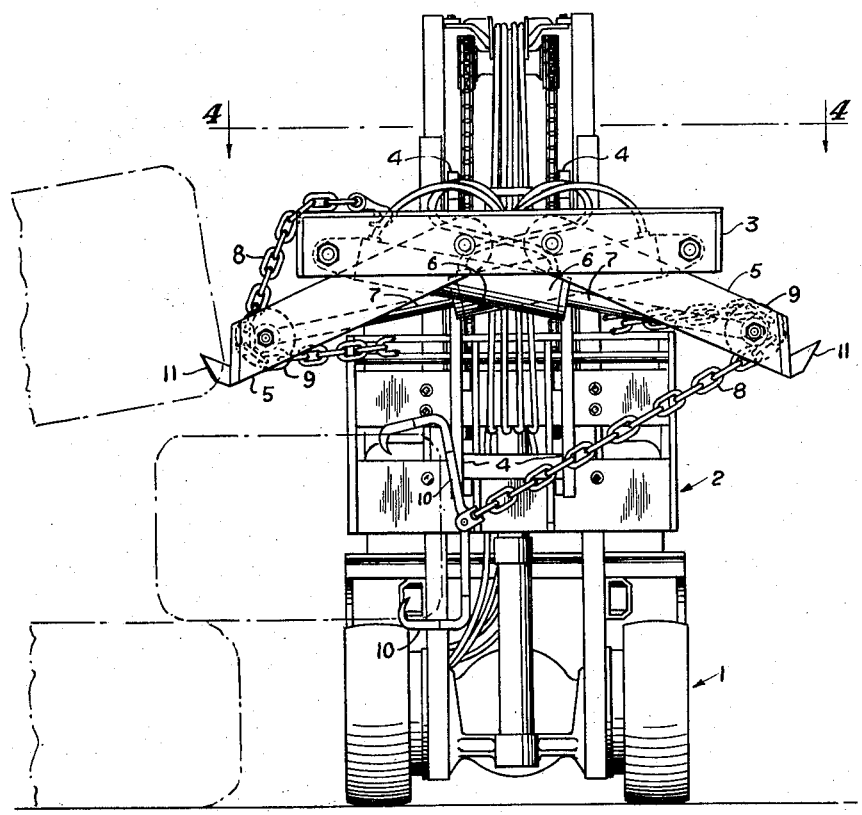
Fig. 1 is a front elevational view of a lift truck having a bale extractor embodying the invention applied thereto, showing the manner in which the bale extractor is used.
Figure 2:
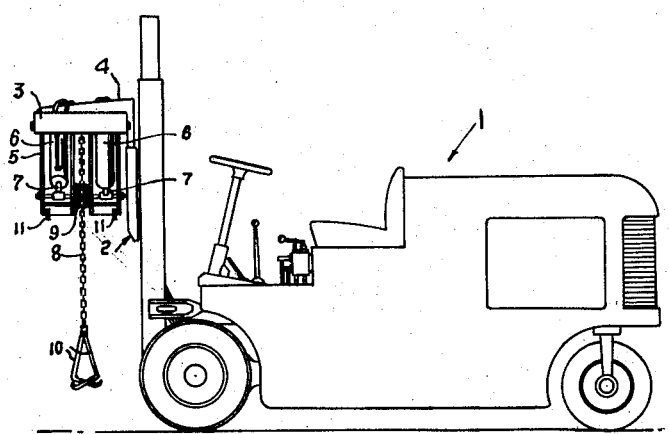
Fig. 2 is a side elevational view, on a reduced scale, showing the bale extractor in its inoperative position.
Figure 3:
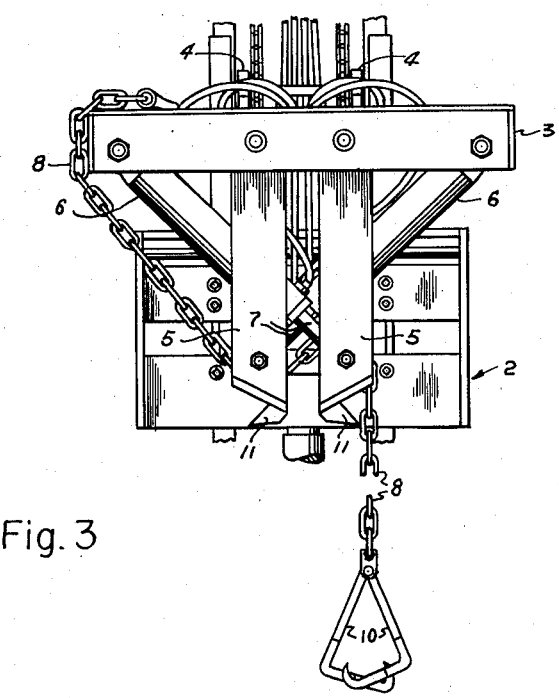
Fig. 3 is a fragmentary front elevational view, showing the bale extractor in its inoperative position.
Figure 4:
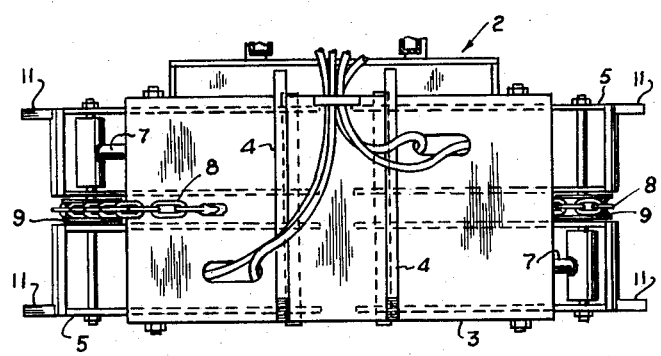
Fig. 4 is a sectional plan view taken on the lines 4—4 of Fig. 1.

Referring to the drawing, a lift truck, which may be of any suitable construction, is designated generally by the numeral 1. The lift truck 1 has a lift carriage which is indicated generally by the numeral 2.

The bale extractor of the invention includes a substantially rectangular frame 3, which is connected to the lift carriage 2 by a pair of brackets 4. The frame 3 lies in a horizontal plane.

A pair of substantially rectangular sub-frames 5 are arranged transversely relative to the frame 3. The sub-frames 5 are pivotally connected at one end to intermediate portions of the frame 3, in spaced relation to each other, and normally depend from the frame 3.

A pair of hydraulic cylinders 6 are each pivotally connected at one end to one end of the frame 3. Each of the hydraulic cylinders 6 has a piston rod 7 pivotally connected to the free end of the sub-frame 5 nearest the opposite end of the frame 3.

A chain 8 is connected at one end to the frame 3, and is looped about a pair of rollers 9 carried by the free ends of the sub-frames 5. The chain 8 has a pair of hooks 10 connected to its outer end for engagement with a selected bale of cotton or the like comprising one of several bales arranged in a stack, as shown in dotted lines in Fig. 1, to pull it from the stack, as the sub-frames 5 are swung outwardly in opposite directions by the action of the hydraulic cylinders 6.

At least one of the sub-frames 5 has toothed projections 11 adjacent its free end for engagement with the bale next above the selected bale, to lift the bale or bales above the selected bale, and restrain them against lateral displacement relative to the stack, while the selected bale is being pulled from the stack.

The invention may be modified in various ways without departing from the spirit and scope thereof.

What is claimed is:

In combination with a lift truck having a lift carriage, a normally horizontally disposed, substantially rectangular frame attached to the lift carriage, a pair of substantially rectangular sub-frames arranged transversely relative to the frame, the sub-frames being pivotally connected at one end to intermediate portions of the frame, in spaced apart relation to each other, and each being rotatable about a horizontal axis parallel to the ends of the frame and normally depending from the frame, a pair of hydraulic cylinders each pivotally connected at one end to one end of the frame and having a piston therein acting on a piston rod pivotally connected at its opposite end to the free end of the sub-frame nearest the opposite end of the frame, whereby the sub-frames are capable of being swung outwardly in opposite directions by the action of the pistons, and a chain connected at one end to the frame and looped about a pair of rollers carried by the free ends of the sub-frames, the chain having a pair of hooks connected to its opposite end for engagement with a selected bale of cotton or the like comprising one of several bales arranged in a stack, to pull it from the stack, as the sub-frames are swung outwardly in opposite directions by the action of the pistons, at least one of the sub-frames having toothed projections adjacent its free end for engagement with the bale next above the selected bale, to lift the bale or bales above the selected bale, and restrain them against horizontal displacement relative to the stack, while the selected bale is being pulled from the stack.

References Cited in the file of this patent
UNITED STATES PATENTS
2,837,231      Ross ------------------ June 3, 1958